United States Patent [19]
Bruins

[11] Patent Number: 6,154,256
[45] Date of Patent: Nov. 28, 2000

[54] SYNC SEPARATOR AND VIDEO SIGNAL DETECTOR CIRCUITS

[75] Inventor: Bryan Bruins, Dundas, Canada

[73] Assignee: Gennum Corporation, Ontario, Canada

[21] Appl. No.: 08/712,267

[22] Filed: Sep. 11, 1996

[30] Foreign Application Priority Data

Sep. 11, 1995 [CA] Canada ................................. 2157986

[51] Int. Cl.⁷ ............................. H04N 5/08; H04N 5/16
[52] U.S. Cl. ........................................ 348/533; 348/695
[58] Field of Search ................................. 348/531, 533, 348/465, 691, 539, 695, 607, 696

[56] References Cited

U.S. PATENT DOCUMENTS

| | | | |
|---|---|---|---|
| 5,034,815 | 7/1991 | Shibayama | 348/533 |
| 5,274,451 | 12/1993 | Koblitz et al. | 348/533 |
| 5,410,366 | 4/1995 | Hostetler | 348/695 |
| 5,483,289 | 1/1996 | Urade et al. | 348/465 |
| 5,486,869 | 1/1996 | Cooper | 348/525 |
| 5,528,303 | 6/1996 | Bee et al. | 348/531 |
| 5,619,275 | 4/1997 | Tults | 348/533 |
| 5,654,764 | 8/1997 | Suh | 348/465 |
| 5,754,250 | 5/1998 | Cooper | 348/525 |

*Primary Examiner*—Victor R. Kostak
*Attorney, Agent, or Firm*—Bereskin & Parr

[57] ABSTRACT

A symmetrical clamp clamps the input video signal to a reference voltage during composite sync pulses, so the coupling capacitor discharge current is kept small between composite sync pulses. For startup, the non-symmetrical clamp employs an operational amplifier, diode and controllable current source to charge the coupling capacitor to a minimum desired level, and to discharge the capacitor e.g. when there is a change in DC level so that the output level is too high. A sync slicing detector is also provided, using two comparators. One comparator compares the slicing level with the clamped video and produces a properly sliced composite sync output, while the other compares the clamped video with a small reference voltage and produces a fixed sync output. If the clamped video level drops suddenly, a delayed version of the fixed composite sync output clocks a flip flop, creating a fault signal which discharges a memory capacitor over a time period. When composite sync pulses are again sliced, the output from the first comparator resets the flip flop. The circuit also includes a video signal detector which enables its sync outputs only when it receives a predetermined number of valid lines of video with the frequency of the lines being in a predetermined range and with the last several lines being relatively free of noise. A timer prevents muting of the outputs if the input signal frequency is disturbed only momentarily.

9 Claims, 14 Drawing Sheets

SYNC SEPARATOR AND VIDEO SIGNAL DETECTOR CIRCUITS

FIELD OF THE INVENTION

This invention relates to sync separator circuits and to video signal detection. More particularly, it relates to circuits which provide more accurate sync tip clamping, more accurate sync slicing, and more reliable video signal detection.

BACKGROUND OF THE INVENTION

Composite video signals include a synchronization component or a sync signal. The sync signal must be separated or sliced from the composite video signal, usually at a fifty percent level which is preferably halfway between the blanking level and the sync tip level. This is usually implemented by systems which clamp the sync tip to a known voltage and then sample the blanking level. Unfortunately, the clamps commonly used for this purpose have a number of disadvantages, e.g. the clamped output voltage tends to droop, and the droop varies with the input duty cycle. In addition the clamps commonly used cause sync tip distortion, and the clamped output tends to ride on the sync tip noise.

In addition, precision sync separator circuits are required to accurately slice or separate the input video signal sync pulse at the fifty percent level for signal amplitudes ranging from 0.5 volts peak to peak to 2.0 volts peak to peak or higher (e.g. 4 volts p-p). When the signal amplitude changes rapidly, e.g. from 2.0Vp-p to 0.5Vp-p, the sync separator slicing level can be higher than the sync amplitude in a typical slow recovering sync separator circuit. This can result in incorrect slicing of the video signal and loss of the sync signal.

In addition, difficulty can be encountered in reliably detecting the presence of a video signal. In the design of a video detector circuit, appropriate criteria must be chosen to determine whether a valid video signal has been received. If the evaluation criteria are too strict, a valid video signal corrupted with impulse noise and random time base errors will not be detected. However if the evaluation criteria are too loose, large amplitudes of pure noise may be detected as a valid signal.

BRIEF SUMMARY OF THE INVENTION

Therefore the invention in one of its aspects provides improved sync tip clamping. In this aspect the invention provides an improved clamping circuit for clamping sync signals in a video signal, said clamping circuit comprising:

(a) an input for said video signal, said video signal having sync pulses therein, (b) a capacitance coupled to said input, (c) symmetrical clamping means and non-symmetrical clamping means each coupled to said capacitance, (d) said symmetrical clamping means comprising amplifier means having an output coupled to said capacitance, said amplifier having an enable input and an input for a first reference voltage, said amplifier being controllable by an enable signal applied to said enable input for clamping the voltage at said output to said first reference voltage, (e) means for providing an enable signal responsive to said sync pulses for enabling said amplifier to cause said amplifier to clamp the voltage at its output to said reference voltage during at least a portion of each sync pulse, (f) said non-symmetrical clamping means including means for charging said capacitance to a predetermined minimum voltage level, (g) said non-symmetrical clamping means further including means responsive to the absence of a continued series of said sync pulses for discharging said capacitance.

In a second aspect the invention provides a video signal detector circuit which provides video signal detection of improved reliability even in the presence of noise. In this aspect the invention provides a video signal detector having a video signal input for receiving a video signal having a series of sync pulses, and having at least one sync signal output, and for enabling said output when a valid video signal is present at said input and for muting said output when no valid video signal is present at said input, said circuit comprising:

(a) circuit means coupled to said input for producing a reference sync signal having reference sync pulses at a frequency corresponding to that of said sync signal, (b) counter means for counting a predetermined number of said reference sync pulses and for producing a predetermined count signal on receipt of said predetermined number, (c) output circuit means coupled to said counter means and responsive to said predetermined count signal for enabling or muting said output in response thereto, (d) frequency circuit means responsive to the frequency of said sync pulses and including comparator means to define the high and low limits of a predetermined range for said frequency and for producing a memory signal indicative of whether said frequency is within said predetermined range, (e) disabling means coupled to said frequency circuit means for causing said output to be muted when said frequency is outside said predetermined range.

In another aspect, in a video signal detector having a video signal input for receiving a video signal having a series of sync pulses, and having at least one sync output, the invention provides a method for enabling the output when a valid video signal is present at the input, the method comprising:

(a) providing circuit means coupled to the input for producing a reference sync signal having reference sync pulses at a frequency corresponding to that of the sync signal, (b) providing counter means for counting a predetermined number of the reference sync pulses and for producing a predetermined count signal on receipt of the predetermined number, (c) providing output circuit means coupled to said counter means and responsive to said predetermined count signal for enabling the output in response thereto, (d) providing frequency circuit means responsive to the frequency of the sync pulses and including comparator means to define the high and low limits of a predetermined range for the frequency and for producing a memory signal indicative of whether the frequency is within said predetermined range, (e) providing noise pulse indicator means responsive to a noise pulse occurring between the sync pulses, (f) determining whether the predetermined count signal is produced, (g) determining whether the memory signal is within the predetermined range, (h) determining whether the number of consecutive sync pulses free from the occurrence of a noise pulse is at least one-half the number of sync pulses required to produce the predetermined count signal, and (i) repeating steps (f) through (h) and enabling the output upon all requirements in steps (f) through (h) being met.

Further objects and aspects of the invention will appear from the following description, taken together with the accompanying drawings.

BRIEF DESCRIPTION OF THE DRAWINGS

In the accompanying drawings, which show preferred embodiments of the invention.

DETAILED DESCRIPTION OF PREFERRED EMBODIMENTS

Figure 1:
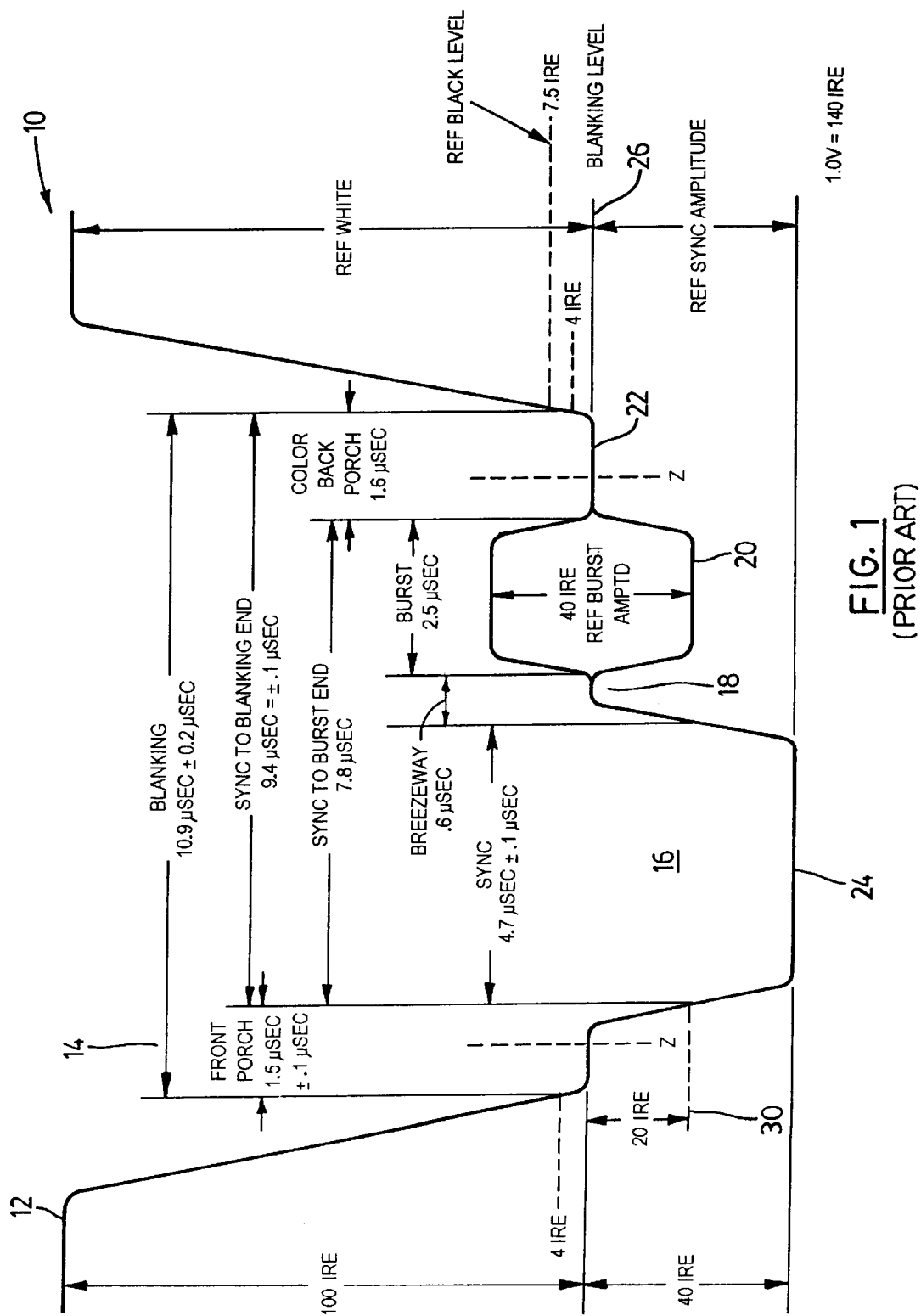
FIG. 1 is a view of a standard NTSC composite video signal.

Reference is first made to FIG. 1, which shows a standard NTSC composite video signal 10. This signal is shown for illustration purposes only since it will be realized that the invention may be used with other video standards, e.g. PAL, SECAM, and others.

As shown, the composite video signal 10 includes a video signal portion 12, a front porch section 14 (typically 1.5 microseconds ±0.1 microsecond), a sync pulse 16 (typically 4.7 microseconds ±0.1 microsecond), a breezeway section 18 (typically 0.6 microseconds), a color burst 20 (typically 2.5 microseconds), and a color back porch 22 (typically 1.6 microseconds). The amplitude of a typical standard signal is 140 IRE above the sync tip 24 (where 140 IRE equals 1.0 volts). The blanking level 26 is typically 40 IRE above the sync tip 24 (as is the back porch level), and the ideal 50% slicing level 30 is 20 IRE above the sync tip level 24 and 20 IRE below the blanking level 26.

Derivation of the 50% slicing level 30 can be achieved either by measuring the sync amplitude directly or by using an automatic gain control (AGC) circuit to amplify or attenuate the sync amplitude to a known level. In both cases, such systems require a clamping type circuit and a sampling and holding type circuit. Either the sync tip 24 is clamped and the blanking level 26 is sampled, or else the blanking level 26 is clamped and the sync tip 24 is sampled. Most systems clamp the sync tip 24 and sample the blanking level 26 since this approach has simpler start-up constraints.

Figure 2:
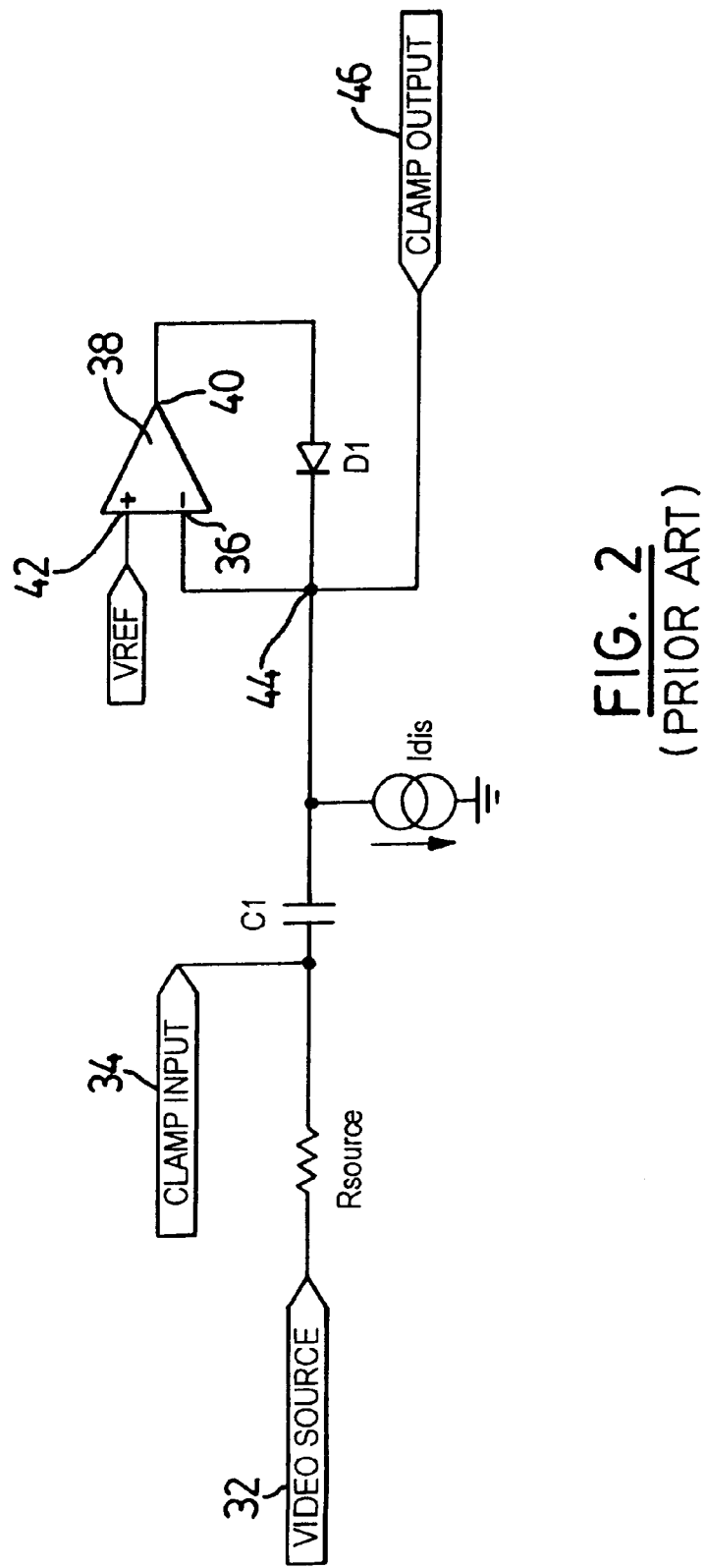
FIG. 2 is a block diagram of a standard prior art sync tip clamp.

Circuits which clamp the sync tip 24 and sample the blanking level 26 normally clamp the sync tip to a known voltage. Since the sync tip is the most negative part of the video signal, a negative peak clamp is used. FIG. 2 shows a common prior art clamp for this purpose. In the FIG. 2 circuit, which is essentially a DC restorer, a video signal source 32 having a source impedance Rsource provides the clamp input signal 34 (which is simply the composite video signal 10 of FIG. 1). The clamp input signal 34 is AC coupled through capacitor C1 to the inverting input 36 of operational amplifier 38. Operational amplifier 38 has unidirectional negative feedback via diode D1 connected between its output 40 and its inverting input 36. A reference voltage Vref is connected to the non-inverting input 42 of operational amplifier 38, while a current source $I_{dis}$ (a discharge current source) is connected between ground and a node 44 between capacitor C1 and inverting input 36.

The clamp output signal 46 (which is simply the clamp input signal, now clamped) appears at node 44.

In operation, when the clamp output signal 46 is lower than Vref, operational amplifier 38 charges capacitor C1 via negative feedback diode D1. When the clamp output is higher than voltage Vref, diode D1 is non-conductive and current source $I_{dis}$ slowly discharges capacitor C1.

Once steady-state operation is reached, the most negative part of the input signal will be clamped to Vref. However since $I_{dis}$ is continually discharging capacitor C1, there is a line to line droop in the clamped output given by:

$$V_{drop} = \frac{I_{dis}}{C1}\left(\frac{1}{f_{scan}} - T_{sync}\right) \quad (1)$$

where $f_{scan}$=Horizontal scan rate
and $T_{sync}$=Sync pulse width

The FIG. 2 circuit has four problems that render it inadequate for sync tip clamping in precision 50% sync separation systems.

The first problem is that the voltage $V_{droop}$ varies depending on the value and manufacturing tolerances of $I_{dis}$. This creates a problem because the slicing point changes by an amount equal to the amount of change in $V_{droop}$. Equation 1 shows that the amount of droop is directly proportional to $I_{dis}$. Therefore, as $I_{dis}$ varies over process tolerances and temperature, the slicing level will also vary. A typical solution to this problem is to make capacitor C1 large and $I_{dis}$ very small (so that $V_{droop}$ is small). However this is an undesirable solution since it decreases the low frequency or hum rejection of the circuit.

The second problem, which is closely related to the first problem, is that $V_{droop}$ varies with the input duty cycle. As will be seen from equation 1, as $T_{sync}$ becomes larger, $V_{droop}$ will become smaller. The resulting change in $V_{droop}$, as before, changes the point at which the input signal is sliced. This problem becomes noticeable during the vertical sync time, when $T_{sync}$ changes from 4.7 microseconds to 54 microseconds.

The third problem is that the clamp of FIG. 2 causes sync tip distortion. Any charge that is removed from the input coupling capacitor (by $I_{dis}$) during non-sync periods must be restored during sync. The current needed to restore the charge flows through the input source resistance $R_{source}$ and causes a voltage drop across this resistance. This voltage drop appears as sync tip distortion. To a good approximation the amount of distortion can be calculated by the following:

$$V_{distortion} = R_{source} I_{charge_{avg}} = R_{source} I_{dis} \left( \frac{\frac{1}{f_{scan}} - T_{sync}}{T_{sync}} \right) \quad (2)$$

It is apparent that $V_{distortion}$ increases directly with the magnitude of $I_{dis}$.

The fourth problem results from the fact that the clamp of FIG. 2 is non-symmetrical. A non-symmetrical clamp is one in which the charging and discharging currents are unequal. In the FIG. 2 circuit the charging current is the maximum positive output current from operational amplifier 38, which is typically one hundred times larger than the discharge current $I_{dis}$. This results in the clamp reacting quickly to negative going pulses but very slowly to positive going pulses. Hence the clamped output level effectively rides on the negative sync tip noise, which is undesirable when the video signal is corrupted by noise.

Figure 3:
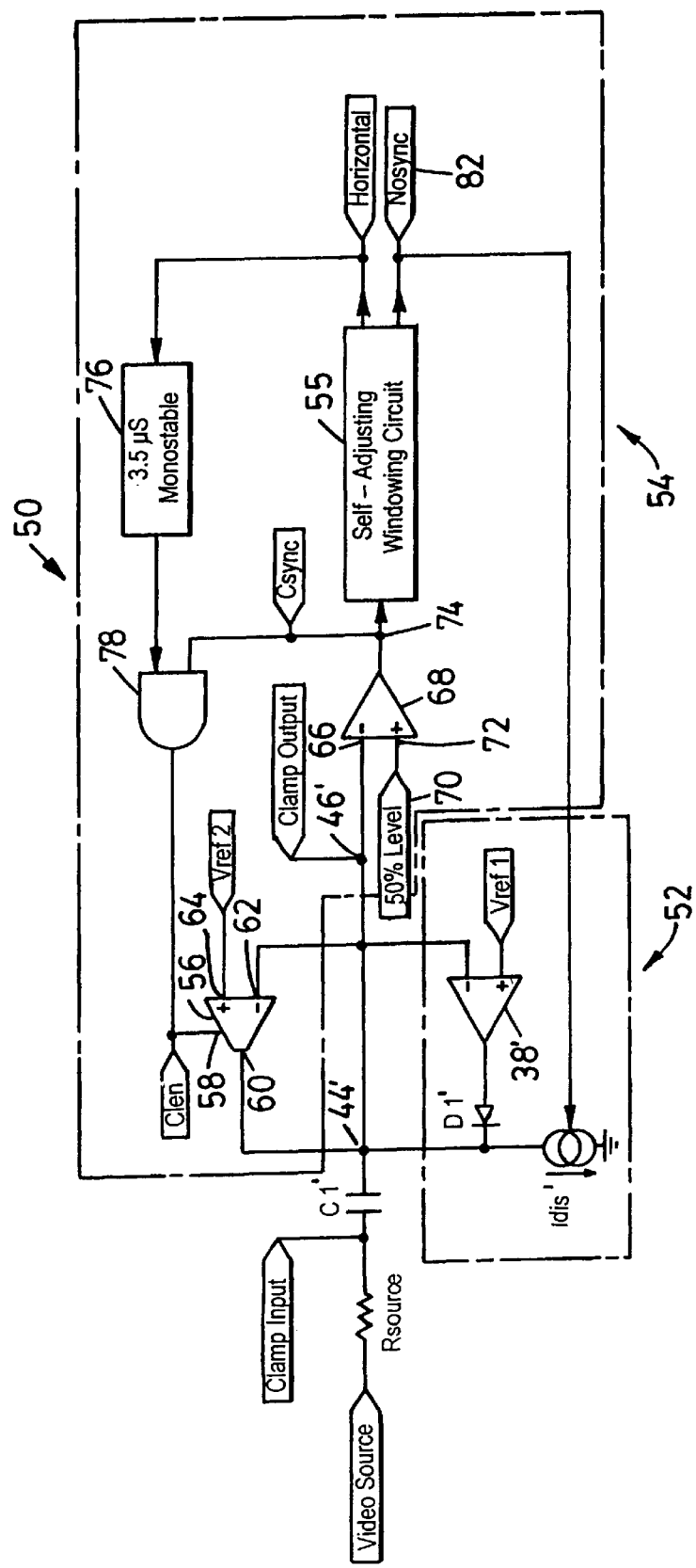
FIG. 3 is a block diagram of an improved sync tip clamp according to the invention.

An improved clamping circuit according to the invention is shown at 50 in FIG. 3. In circuit 50, parts corresponding to those of FIG. 2 are shown with primed reference numerals.

The clamping circuit 50 includes a non-symmetrical clamp 52 and a symmetrical clamp 54. The symmetrical clamp 54 includes a circuit 55 which is referred to as a "self-adjusting windowing circuit". Circuit 55 is described in detail in U.S. Pat. No. 5,432,559 issued Jul. 11, 1995 and entitled "Self-Adjusting Windowing Circuit with Timing Control", assigned to the assignee of the present invention. The drawings and description of that patent are hereby incorporated in their entirety into this application by this reference.

In the FIG. 3 circuit, a controlled transconductance amplifier 56 has a control input 58, and has its output 60 connected to node 44' which is also connected to its inverting input 62. When enabled at control input 58 by enable signal Clen, amplifier 56 functions to charge or discharge capacitor C1' to equate the clamp output 46' with a reference voltage Vref2 applied to the non-inverting input 64 of amplifier 56. It is only during the composite sync pulses 16 that amplifier 56 is enabled and then by its action clamps the sync tips 24 to Vref2.

Figure 4:
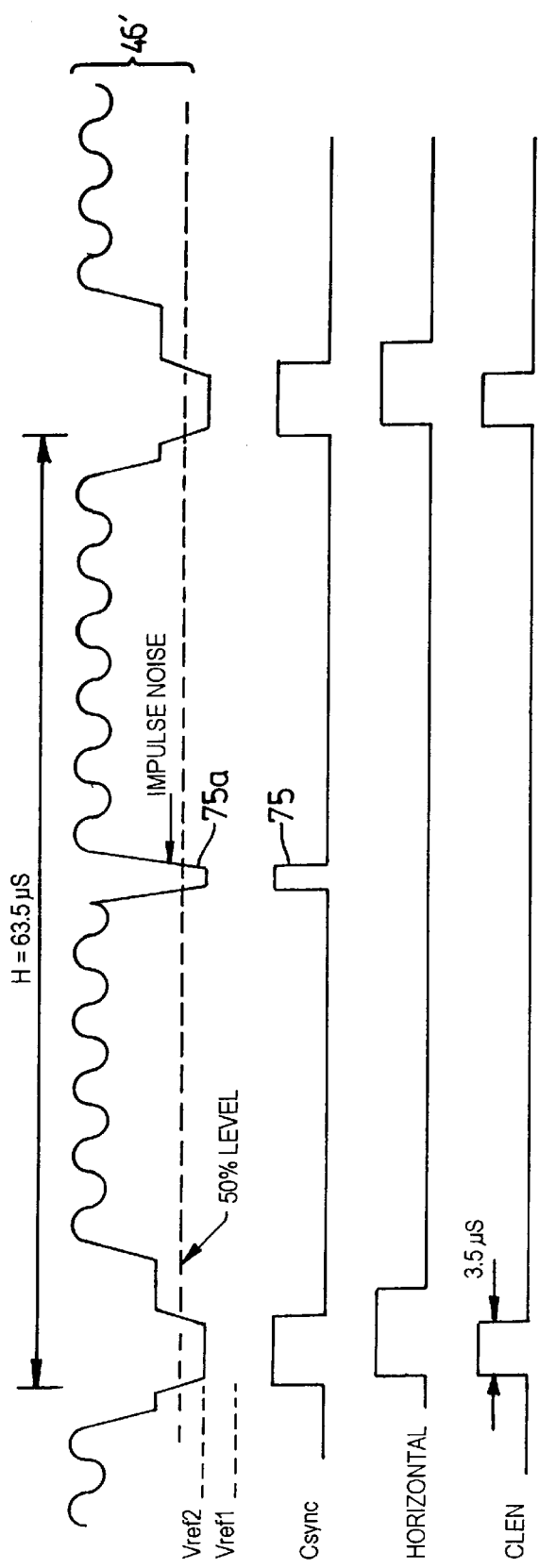
FIG. 4 shows sync tip clamping signals produced by the circuit of FIG. 3.

The clamp output 46', i.e. the clamped video signal (as shown in FIG. 4), is applied to the inverting input 66 of a comparator 68. A 50% level signal 70, which is representative of the 50% slicing level 30, is applied to the non-inverting input 72 of comparator 68. (The manner in which signal 70 is obtained will be explained below.) The difference between the two signals, i.e. the raw composite sync signal Csync, is output at the output 74 of comparator 68. Signal Csync is shown in FIG. 4 and may include noise pulses 75, when impulse noise 75a crosses the 50% level 30.

In order to provide reliable clamping in the presence of noise, it is desirable that the enable signal Clen applied to control input 58 of amplifier 56 be noise tolerant. To achieve this objective, the enable signal Clen is generated using the self-adjusting window circuit 55 in conjunction with a monostable 76 (shown as having a 3.5 microsecond period), and AND gate 78.

The self-adjusting window circuit 55, which is fully described in the above-mentioned patent, is in one of its aspects a lowest frequency detector. It receives video lines (which may be at a frequency typically of 15.7 KHz), and can accept frequencies varying ±25% to ±30% of that value. It adjusts itself to the lowest frequency, opens a window several microseconds before it expects the next composite sync pulse to arrive, and closes the window after such sync pulse ends. Since it will not accept composite sync pulses unless the window is open, noise occurring when the window is closed is rejected. Circuit 55 as explained is also capable of self adjusting, using a ramp circuit which provides a ramp voltage. If no sync pulses are received, the ramp voltage increases until it sets an error or fault flag. However if a composite sync pulse is received, the ramp voltage is reset, and the point where it resets is memorized and stored on a capacitor which controls when the window is opened.

The raw composite sliced sync signal Csync, is applied to the input of the self-adjusting window circuit 55. Window circuit 55 processes signal Csync and produces as one of its outputs a signal referred to as Horizontal, shown in FIGS. 3 and 4 (and explained in detail in said patent). Signal Horizontal is a noise tolerant and constant frequency signal with its rising edge beginning about 100 nanoseconds after the rising edge of Csync (the delay being caused mainly by processing), and with an arbitrary width. However each pulse of Horizontal sync is timed to end after each horizontal sync pulse of signal Csync and is typically 7.0 microseconds in duration.

The rising edge of Horizontal is used to trigger the 3.5 microsecond monostable 76. The output of monostable 76 is gated by AND gate 78 and used to strobe or control amplifier 56. Thus, by using the Horizontal signal as the trigger, a reliable, noise tolerant enable pulse Clen, also shown in FIG. 4, is generated.

Ideally the period of monostable 76 would be the complete width of the horizontal sync pulse. However because of manufacturing tolerances, a value of 3.5 microseconds has been chosen so that the worst case strobe pulse width (i.e. width of Clen) does not exceed the horizontal sync pulse width of 4.7 microseconds.

Figure 5:
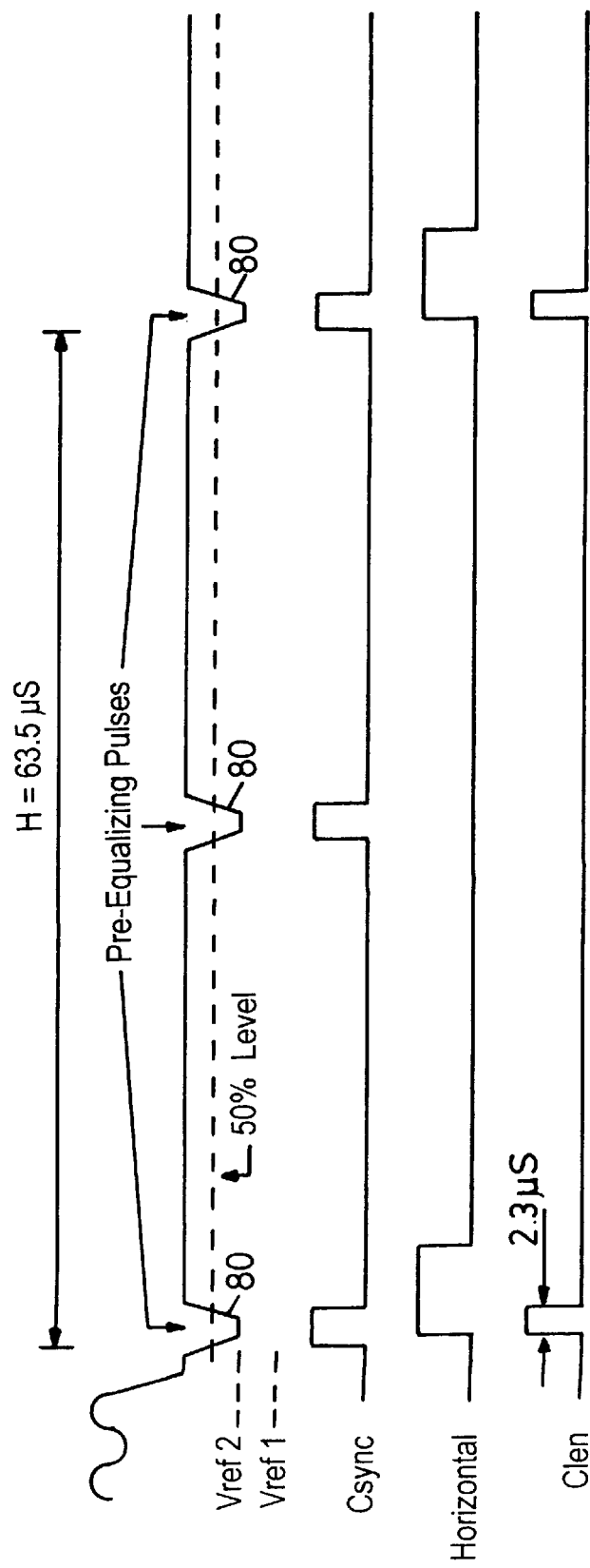
FIG. 5 shows pre-equalizing period clamp signals produced by the circuit of FIG. 3.

It is noted that during the pre-equalizing and post-equalizing periods (which occur respectively before and after the vertical sync pulses twice per frame), there are three horizontal lines of equalizing sync pulses 80 (FIG. 5) that are 2.3 microseconds in width. In order to maintain accurate clamping through these periods, signal Csync is supplied as a second input to AND gate 78. For these lines, since the width of each sync pulse of Csync is 2.3 microseconds, the width of enable pulse Clen will be limited to slightly less than 2.3 microseconds, as shown in FIG. 5.

It will be realized that valid composite sync pulses are needed for the symmetrical clamp 54 to operate properly, and at startup, the initial conditions on capacitor C1 may not guarantee that the required conditions will occur. Therefore the non-symmetrical clamp 52 is provided to perform a startup function. Clamp 52 is similar to that shown in FIG. 2 but can now be enabled and disabled. In operation, if the output clamp level is lower than $Vref^1$, operational amplifier 38' and diode D1' function to charge capacitor C1' to the level of $Vref^1$. If the output level is far too high, no sync pulses will be outputted by comparator 68 since the clamp output will be far above the 50% slicing level (in effect there is a high DC offset). As explained in the above-identified patent, when the self-adjusting window circuit 55 does not receive sync pulses, it then sets a "nosync" flag indicated at 82. The nosync flag 82 enables current source $I_{dis}'$, allowing the current source to discharge capacitor C1' to a level at which composite sync pulses again begin to appear.

During normal operation the tips of the sync pulses are clamped to Vref2, which is typically 30 millivolts higher than Vref[1], and the lack of a nosync signal has disabled current source $I_{dis}'$. This makes the non-symmetrical clamp 52 inactive so that it does not affect the functioning of the symmetrical clamp.

The improved sync tip clamp circuit described in connection with FIGS. 3 to 5 does not suffer from the four major problems associated with the standard clamping circuit shown in FIG. 2.

With respect to the first problem, which was the variation in the droop voltage, it will be seen that in the FIG. 3 circuit, current source $I_{dis}'$ is turned off during normal operation. Therefore the only discharge currents present are the input bias currents of transconductance amplifier 56, comparator 68 and operational amplifier 38'. These input bias currents, utilizing standard techniques well-known to those skilled in the art, can be made insignificantly small (e.g. about 100 nanoamperes in total) so that the droop voltage is negligible for reasonable values of C1'. This eliminates slicing level changes caused by variations in $I_{dis}'$.

The second problem, which was that the droop voltage varied with the input duty cycle, is solved by turning off $I_{dis}'$ during normal operation and by the addition of the symmetrical clamp. Removal of $I_{dis}'$ removes the $V_{droop}$ variation caused by input duty cycle changes which cause changes in the slicing point. The symmetrical clamp 54 then acts to provide the input coupling capacitor discharge mechanism which was previously performed by $I_{dis}'$. The discharge is needed for rejection of "hum" without loss of the Csync output. As noted, the symmetrical clamp 54 output level is not sensitive to input duty cycle variation because the enable strobe Clen sets the duty cycle of the clamp and $I_{dis}'$ is inactive during normal operation.

The removal of $I_{dis}'$ also addresses the third problem, which was sync tip distortion. Since the amount of charge removed from the input capacitor C1' during non-sync periods is now negligible, the amount of charge to be replaced during sync periods is also negligible. The result is that sync tip distortion is much reduced and is not noticeable.

Fourthly, since the input clamp is now symmetrical, the clamp output will not ride on the sync tip noise. The equal charge and discharge currents cause the clamp to respond in an equal manner to both the positive and negative excursions of noise signals. Therefore the clamp output will tend toward the average sync tip voltage, as desired.

Figure 6:
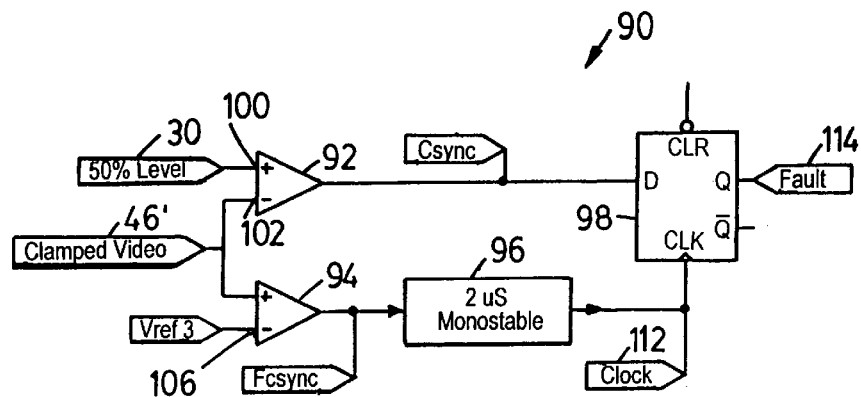
FIG. 6 is a block diagram of a sync slicing detector according to the invention.

Reference is next made to FIG. 6, which shows at 90 a sync slicing detector according to the invention. The detector 90 includes in a preferred embodiment a 50% slicing comparator 92, a fixed level slicing comparator 94, a two microsecond monostable 96, and a D-type flip flop 98.

The 50% slicing comparator 92 has the 50% level 30 (derived as will be explained) applied to its non-inverting input 100, while the clamped video 46' (FIGS. 3 and 4) is applied to its inverting input 102. As in the case of FIGS. 3 and 4, the output from comparator 92 is the composite sync signal Csync and is the D input to the D flip flop 98.

The fixed level slicing comparator 94 has the clamped video 46' applied to its non-inverting input 104. A reference voltage Vref3 is applied to its inverting input 106. Voltage Vref3 is a fixed DC voltage which is set 40 millivolts above the sync tip clamping level 24 Vref2. The 40 millivolt level, which is somewhat arbitrary, is chosen so that for the smallest input signal, composite sync will always be produced at the output of comparator 94. This composite sync signal may be termed "fixed composite sync" or Fcsync. The purpose of Fcsync will be appreciated with reference to FIGS. 7 and 8.

Figure 7:
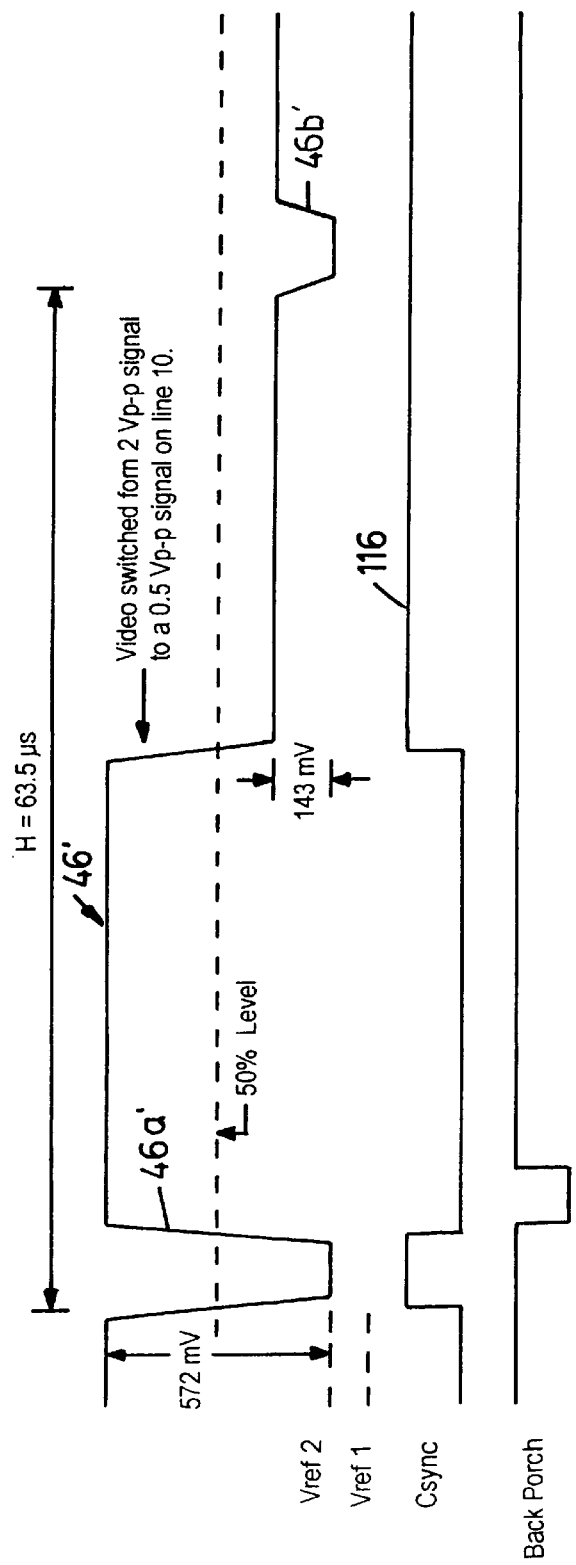
FIG. 7 is a view showing video and sync signals processed by the circuit of FIG. 6.

FIG. 7 shows the situation when the clamped video signal 46' is switched from 2 volts peak to peak to 0.5 volts peak to peak. In that case the sync pulses, which as mentioned are equal to 28.6% of the stated peak to peak value, go from 572 millivolts as shown at 46a' to 143 millivolts as shown at 46b'. At this lower level, the 50% slicing level shown at 30 is higher than the sync amplitude, so that the sync signal will not be accurately sliced or separated. The result is that while a Csync signal and a back porch signal (FIG. 7) are produced when the clamped video is at 2 volts peak to peak, no such signals are produced for a period of time after the video has switched to 0.5 volts peak to peak.

In the FIG. 6 circuit, the positive edge 110 (FIG. 8) of the Fcsync signal is used to trigger the 2 microsecond monostable 96. Monostable 96 then produces a clock signal 112 for the D flip flop 98. Two microseconds is chosen for the period of the monostable so that the clock signal 112 which is generated will sample the Csync signal before the active video starts.

If the 50% level comparator 92 is slicing the sync pulse, then the Csync level will be low when the clock goes high, and the output of the D flip flop 98, termed "fault" and shown at 114, will be low. The circuit will then operate normally, slicing the sync pulses as shown at the left hand side of FIGS. 7 and 8.

If the slicing level is too high (effectively slicing video), then the 50% level comparator 92 will be comparing the 50% level 30 with the clamped sync pulses, which will be lower than the 50% level 30. Therefore the Csync signal will be high as shown at 116 in FIGS. 7 and 8. If Csync is high when the clock signal 112 goes high, this causes the fault signal 114 from flip flop 98 to go high, as shown at 114a in FIG. 8. The high fault signal causes the 50% slicing level 30 to be lowered in the manner explained below.

In summary, it will be seen that the FIG. 6 circuit is readily able to detect when the 50% slicing level which has been established is no longer slicing the sync signal and has therefore failed to produce a Csync signal. In this way a more rapid response to lack of correct sync slicing is accomplished.

Figure 8A:
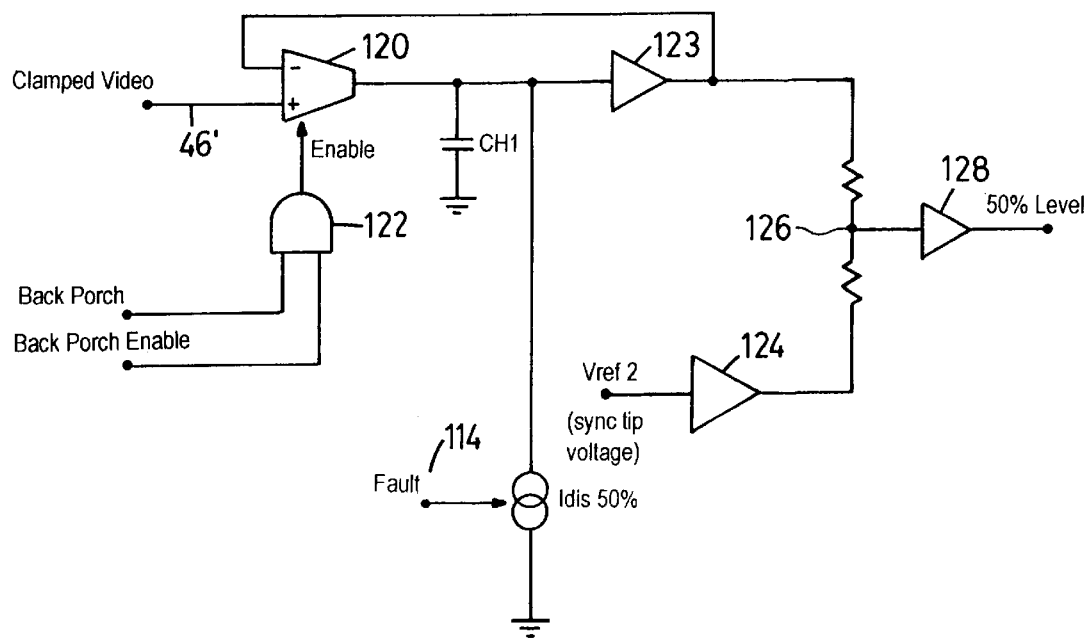
FIG. 8A is a block diagram of an implementation of the 50% level portion of the FIG. 6 detector.
Figure 8:
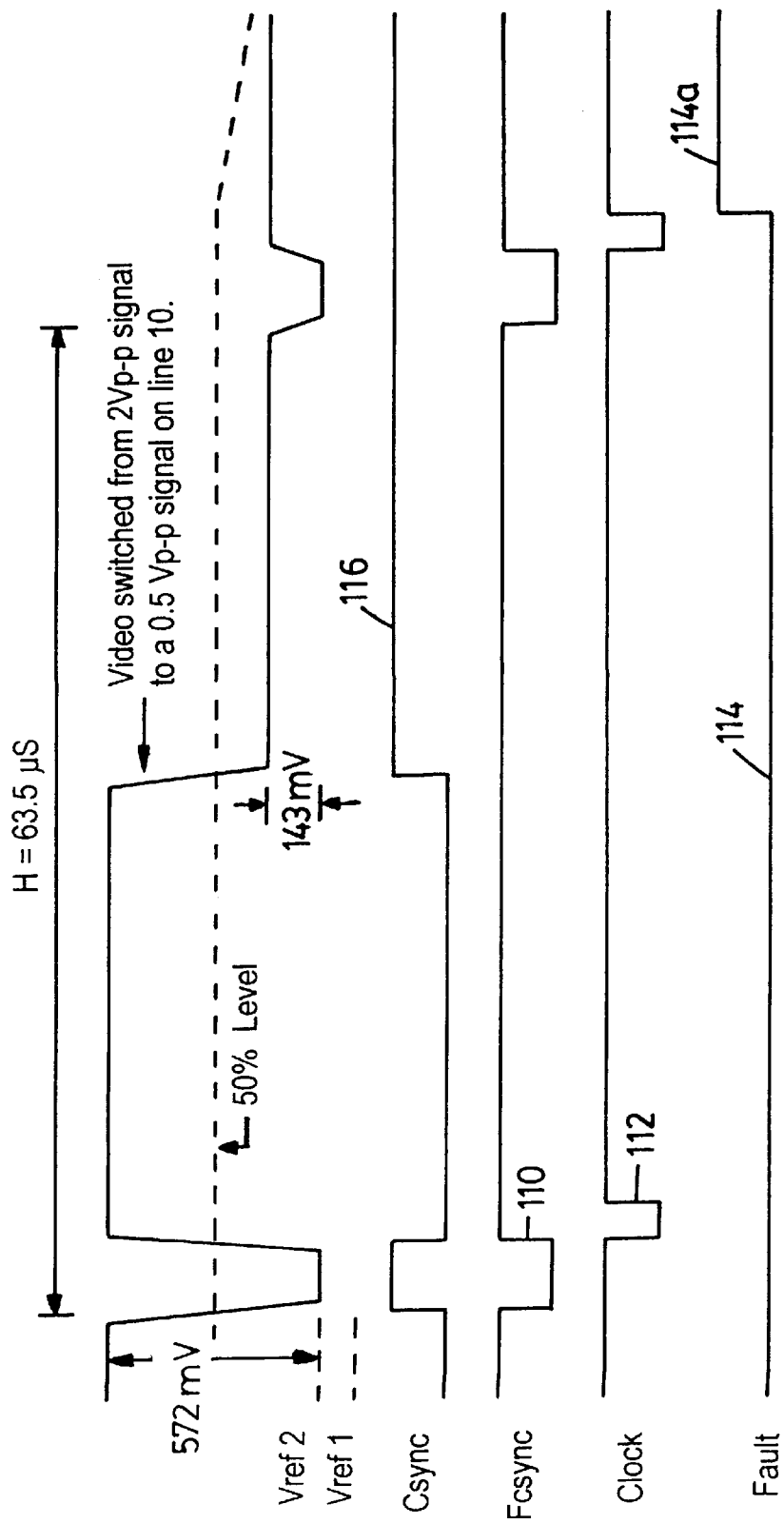
FIG. 8 is a view similar to that of FIG. 7 but showing fault processing and detection signals from the circuit of FIG. 6.
Figure 8B:
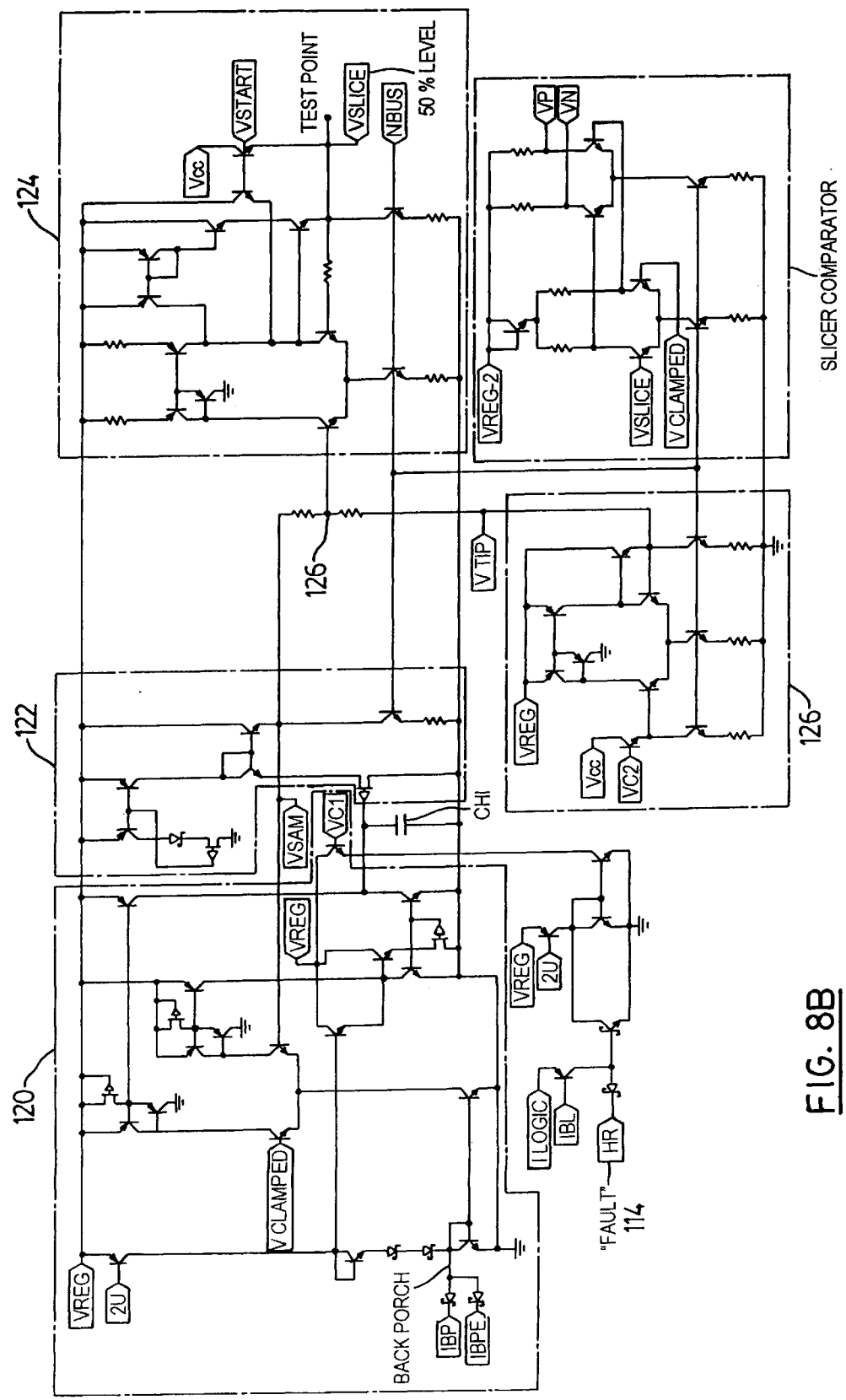
FIG. 8B is a detailed circuit implementation of the FIG. 8A block diagram.

The derivation of the 50% level 30, and the manner in which the fault signal modifies the 50% level, are described with reference to FIGS. 8A and 8B. As shown in FIG. 8A, clamped video 46' is fed to a strobed trans-impedance amplifier 120. Amplifier 120 is enabled and disabled by the back porch and back porch enable signals from window circuit 55 (as explained in said patent), through AND gate 122. The back porch enable signal enables AND gate 122 to gate the back porch signal to amplifier 120 and hence provides a constant rate back porch pulse and blocks false back porch pulses that may be created by impulse noise within the input video signal.

A memory capacitor CHI is connected to the output of amplifier 120 and is used to integrate and hold a voltage by integrating over the time that amplifier 120 is enabled. The voltage on CHI is buffered by a high impedance buffer 123 and fed back to the inverting input of amplifier 120. Thus amplifier 120 functions to charge and discharge capacitor CH1 so that the output of buffer 123 (the back porch voltage) equals the non-inverting input of amplifier 120 when enabled. Since amplifier 120 is enabled only during the back porch interval, the output of buffer 123 will be equal to the video signal's back porch voltage or blanking level.

The back porch voltage from buffer 123, and a buffered version of Vref2 (the sync tip clamping voltage, fed through buffer 124) are applied across two matched and equal resistances R. The center tap 126 between resistors R provides the 50% slicing level 30. The 50% level 30 is tapped from this point and fed through a unity gain buffer 128 to input 72 of comparator 68 of FIG. 7.

The fault signal 114, when set high, serves to turn on the current source $I_{dis50\%}$ to a relatively high current level (e.g. 450 nanoamperes), thus discharging memory capacitor CH1 and consequently lowering the output of buffer 123 (back porch voltage) and hence the 50% slicing level 30. Current source $I_{dis50\%}$ is maintained at this discharge rate until the fault signal 114 goes low.

Transimpedence amplifier 120, high impedance buffer 122, buffers 124 and 128, and the current source $I_{dis50\%}$, may be implemented in various ways as will be known to those skilled in the art. A preferred implementation is shown for illustrative purposes in FIG. 8B.

Figure 9:
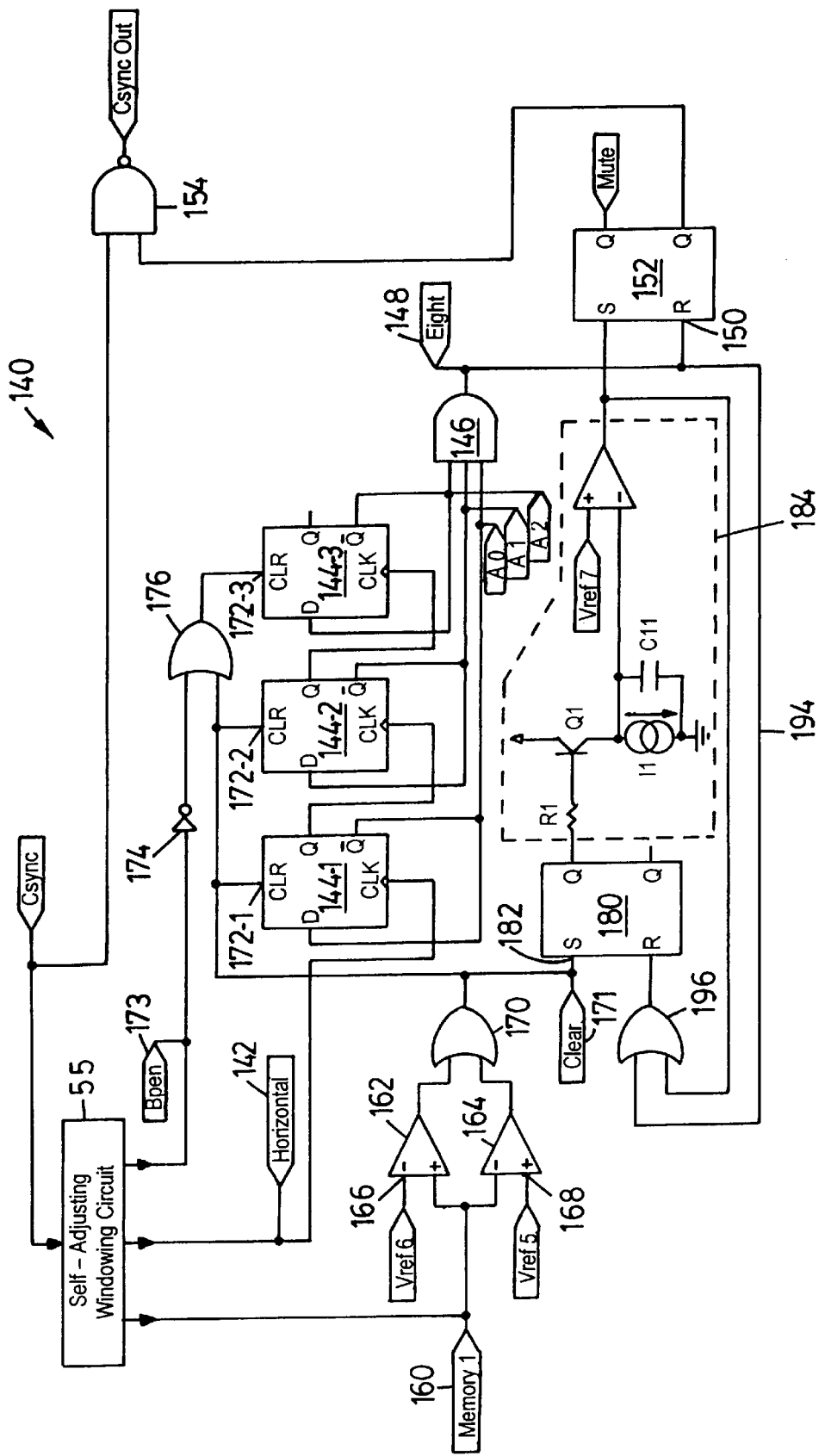
FIG. 9 is a block diagram of a video signal detector according to the invention.

Reference is next made to FIGS. 9 to 12, which show another aspect of the invention. FIG. 9 shows a video signal detection circuit 140 which provides a more reliable control signal which will enable the sync separator outputs only when the circuit 140 decides that a valid video signal is present at its input. When the input signal is not considered to be valid, then the outputs are muted to the logic high state.

The video detector circuit 140 of FIG. 9 uses as its main criteria for determining whether a valid video signal is present at its input, that eight valid horizontal lines of video must be received at the input (a different number of lines could be chosen, depending on design criteria). To determine whether 8 lines have been received, the signal Horizontal, indicated at 142 in FIGS. 9 to 12 and produced by the self-adjusting window circuit 55 as previously described, is used to clock a three bit counter 144. The counter 144 is made up of three D-type flip flops 144-1, 144-2, 144-3 as shown in FIG. 9. When the count of eight is reached, all the inputs to AND gate 146 are high and the output signal 148 (termed "Eight") from AND gate 146 goes high. This high signal, applied to the reset input 150 of RS flip flop 152, resets flip flop 152, causing the mute signal Mute at the output of flip flop 152 to go low and Mute to go high. The Mute signal is applied to one input of NAND gate 154, together with the Csync signal. This permits signal Csync Out to appear at the output of NAND gate 154.

Figure 10:
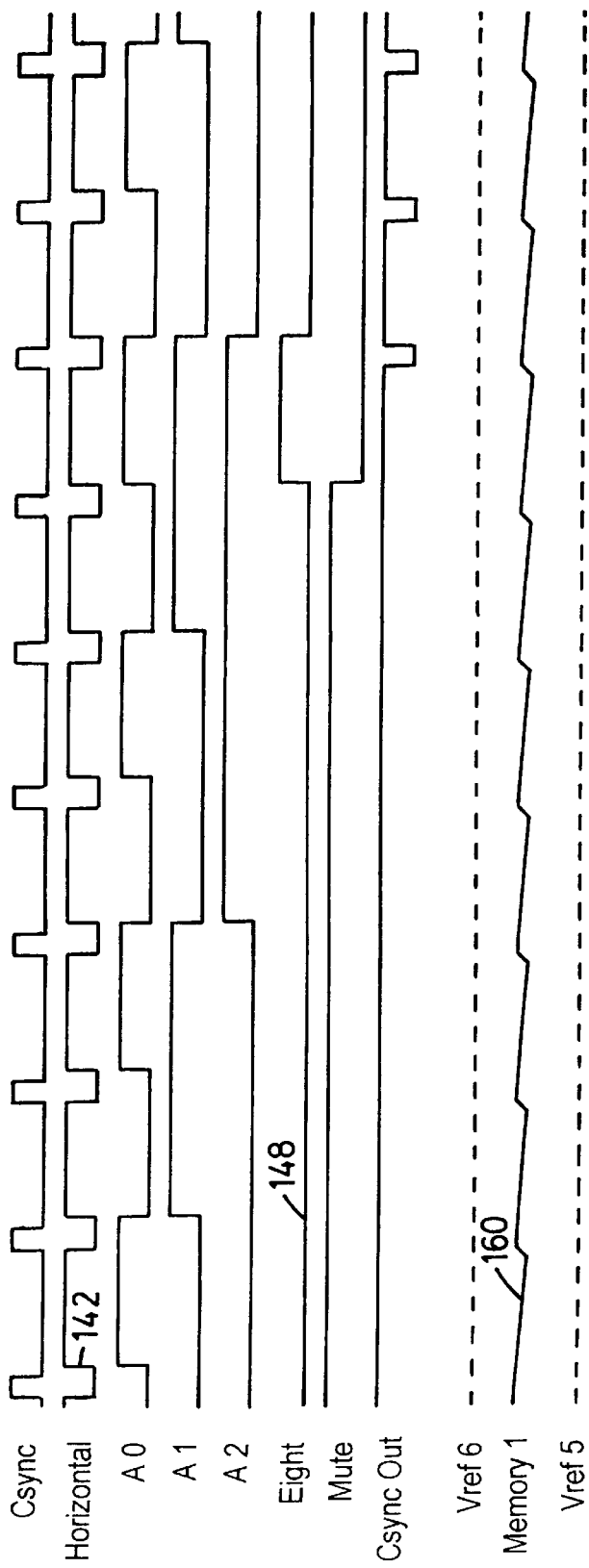
FIG. 10 is a view of signals from the circuit of FIG. 9.

This situation is shown in FIG. 10, where Csync is shown at the top line of the drawing, signal HORIZONTAL is shown at 142, and the counter outputs are shown at A0, A1 and A2. When the "eight" signal 148 goes high, signal Mute goes high, allowing signal Csync out to appear at the output (this occurs on receipt of the eighth Csync pulse).

The same operation, through RS flip flop 152 and other NAND gates (not shown), is performed for the other outputs of the signal detector, namely the back porch signal, the horizontal sync, the vertical sync, and the odd-even signal. These outputs are not shown since they are well-known to those skilled in the art.

To help prevent false enabling of the outputs such as NAND gate 154 for the Csync Out signal, the three bit counter 144 is reset to zero when the horizontal frequency is incorrect. In other words, if the frequency of the input signal does not correspond to the frequency of the horizontal lines within an allowed range, then the counter 144 is reset. Thus, a determination must be made that the input is not within the valid frequency range.

A measure of the frequency of the horizontal lines is the Memory 1 signal indicated at 160 from the self-adjusting window circuit 55. This signal, as explained in the above-identified patent, is a voltage which corresponds to the frequency of the horizontal lines. A lower frequency causes a higher voltage Memory 1 signal, while a higher frequency causes a lower voltage Memory 1 signal.

Therefore, the Memory 1 signal 160 is applied to the non-inverting and inverting inputs respectively of comparators 162 and 164. A reference voltage Vref6 is applied to the inverting input 166 of comparator 162, while a voltage reference Vref5 is applied to the non-inverting input 168 of comparator 164. The outputs of the comparators 162, 164 are applied through an OR gate 170 to the clear inputs 172-1, 172-2, 172-3 of the flip flops 144-1, 144-2, 144-3.

When the Memory 1 voltage 160 is higher than Vref5 and lower than Vref6, the horizontal line frequency is considered to be correct (as shown in FIG. 10) and the outputs of both comparators 162, 164 are low, so that the flip flops 144-1, 144-2, 144-3 are not reset. If the Memory 1 voltage goes outside the correct range as shown at 160-1 and 160-2 in FIG. 11, then the output of either comparator 162 or comparator 164 goes high, and via OR gate 170 produces a high "clear" signal 171 which clears all three flip flops 144-1, 144-2, 144-3, thus resetting the counter 144 to zero. This state in which the counter is cleared will remain so long as the horizontal frequency is outside of the allowed range determined by reference voltages Vref5 and Vref6.

The conditions that eight horizontal lines have apparently been received, and that the Memory 1 voltage 160 is in the correct range, are not a complete guarantee of a valid signal. When the input is pure noise, the Memory 1 voltage 160 will move in and out of the correct frequency range, and it is possible for it to be in the correct range for a time long enough to produce a count of eight on the counter 144 and to enable the outputs. To prevent this from happening, the back porch enable signal Bpen, shown at 173 and generated by the self-adjusting window circuit 55, is used. As explained in the above-identified patent, the Bpen signal 173, when low, indicates that there has been a noise pulse at some time between two consecutive horizontal pulses. With a noisy input, this would be continuously happening.

Therefore, the Bpen signal 173 is applied through a NOT gate 174 and an OR gate 176 to the clear terminal 172-3 of the third flip flop 144-3. When the Bpen signal goes low, it is inverted by NOT gate 174 and, if the flip flops are not already being cleared, it functions via OR gate 176 to clear the most significant bit of the counter 144 and prevent a count of eight occurring.

Only the most significant bit is cleared because the Bpen signal 173 is not a strong indication of an invalid signal (although there is as mentioned a correlation between its occurrence and an invalid signal). The Bpen signal will occur if there are noise pulses in a valid video signal, and also during the vertical interval when the sync pulses occur at double the normal frequency. In these cases the outputs such as Csync out will eventually be enabled.

Thus, by clearing only the most significant bit, the requirement for enabling the output becomes eight horizontal lines with the Memory 1 signal 160 in the correct range (i.e. the frequency in the correct range), and with the last four lines being noise free. In other words, clearing the most significant bit only, rather than resetting the counter to zero, has the effect of setting the minimum number of consecutive lines which must be noise free (4 lines) at one-half the total number of lines which must be counted (8 lines) in order for the output to be enabled. This situation is as shown in FIG. 10, which shows the respective signals described (except for the Bpen signal which is assumed to be low at all relevant times). This condition is less stringent than eight consecutive noise free lines and therefore makes it easier to detect the presence of video even when the signal is corrupted with impulse noise.

Figure 11:
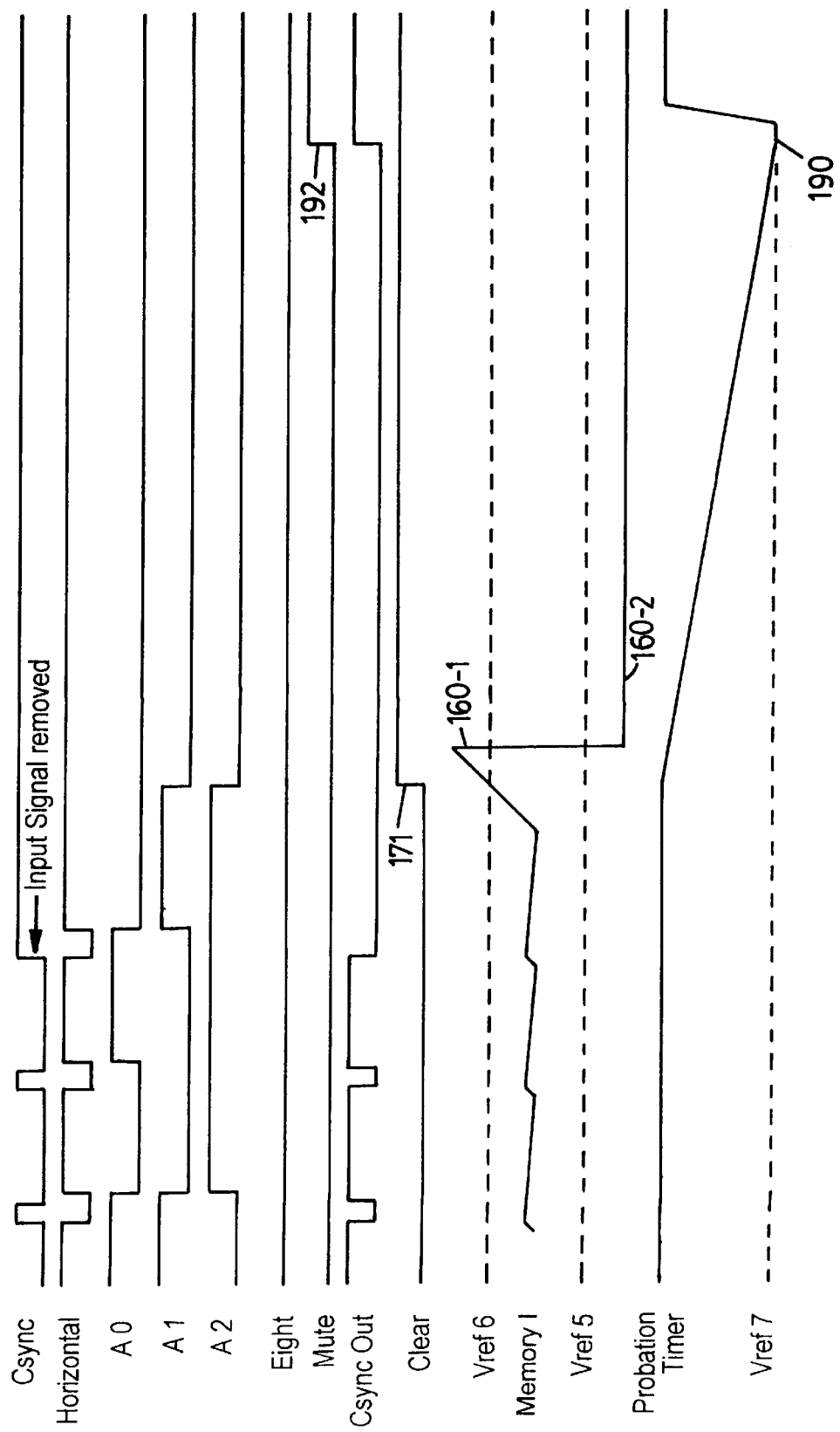
FIG. 11 is a diagram of further signals produced by the circuit of FIG. 9.

The condition for muting the output, assuming that eight valid lines have been received, is that the input video signal must be removed or its frequency changed. Either one of these will cause the Memory 1 voltage 160 to leave the correct frequency range as shown at 160-1, 160-2 in FIG. 11, and the Clear signal 171 to go high, as shown in FIG. 11. When the Clear signal 171 is high, this resets the entire counter 144 as previously mentioned and also sets an RS flip flop 180 via set terminal 182. The setting of RS flip flop 180 starts a probation timer 184 which includes the resistor R1, transistor Q1, current source I1, capacitor C11, comparator 186, and a reference voltage source Vref7.

The purpose of the probation timer 184 is as follows. As mentioned, when the horizontal frequency is incorrect, the Clear signal 171 goes high which clears the counter 144 and starts the probation timer. The probation timer 184 provides a period of time to determine whether the frequency error is a serious loss of signal or is a momentary input signal glitch. Input signal glitches can be in the form of large time base errors or missing sync pulses. If the frequency error is caused by the loss of the input signal, then the Memory 1 signal 160 will remain outside the correct range, as shown at 160-2 in FIG. 11, and the probation timer will time out as indicated at 190 in FIG. 11. The outputs are then muted as indicated at 192 in FIG. 11.

Figure 12:
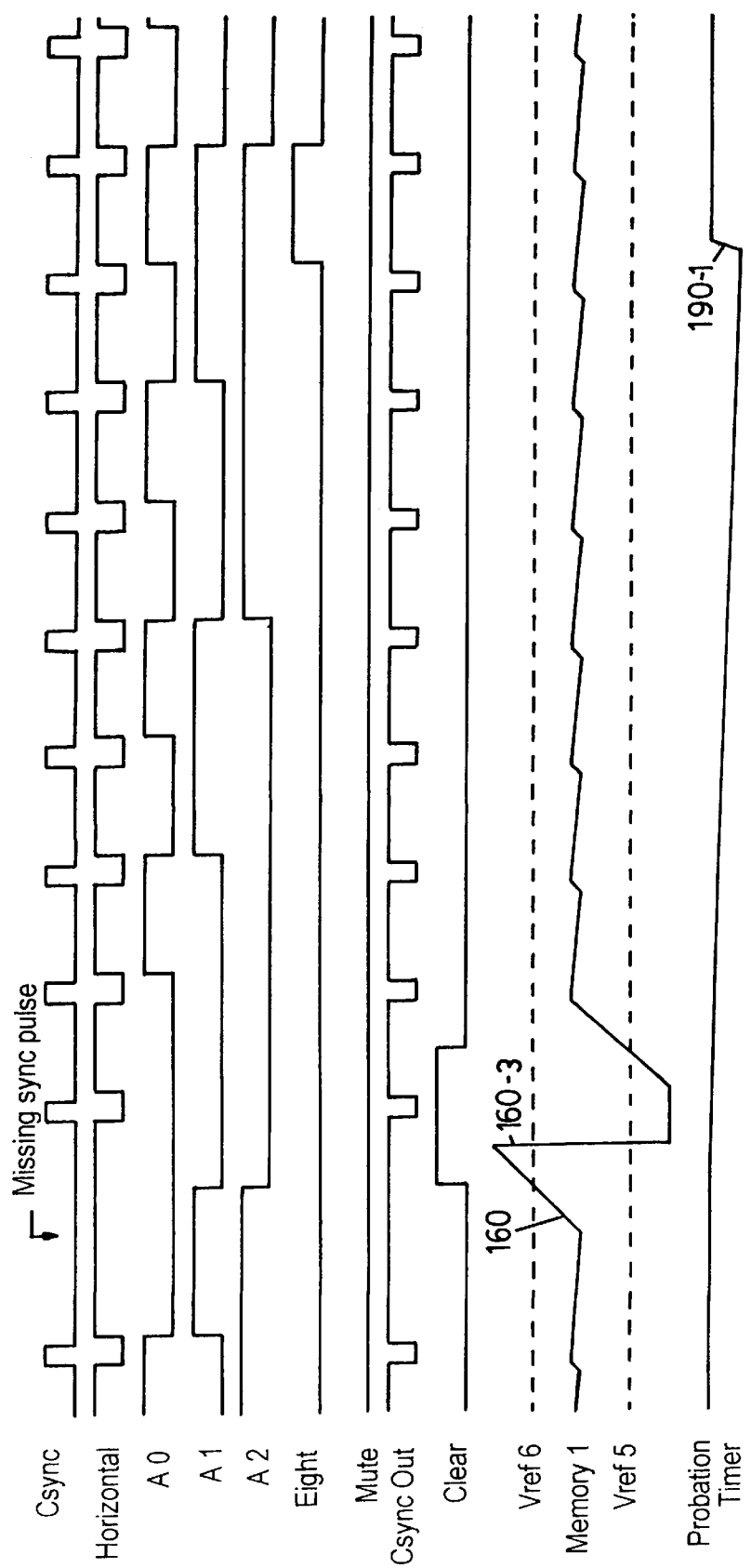
FIG. 12 is a further diagram of signals produced by the FIG. 9 circuit.

However if only a momentary interruption in the input signal has occurred, as indicated by the disturbance 160-3 in the Memory 1 signal in FIG. 12, so that a count of eight is reached before the probation timer expires (indicated at 190-1 in FIG. 12), then the probation timer is reset and the outputs remain enabled, since the mute signal as shown in FIG. 12 remains low. In this way premature or false muting of the output signals is prevented.

The detailed operation of the probation timer 184 is as follows. When RS flip flop 180 is set, this shuts off transistor Q1, allowing current source I1 slowly to discharge capacitor C11. Capacitor C11 will continue to discharge until it goes below voltage Vref7, or until the Eight signal 148 goes high. If the Eight signal goes high, RS flip flop 180 is reset via lead 194 and OR gate 196, turning transistor Q1 back on and causing C11 to charge back up to its initial condition. The probation timer 184 is now reset.

If capacitor C11 discharges below Vref7, then the output of comparator 186 goes high, causing two events to occur. Firstly, RS flip flop 152 is set, causing Mute signal at its Q output to go low, disabling the outputs as previously described. The second event is that the RS flip flop 180 is reset via OR gate 196, which as described previously resets the probation timer 184.

Figure 13:
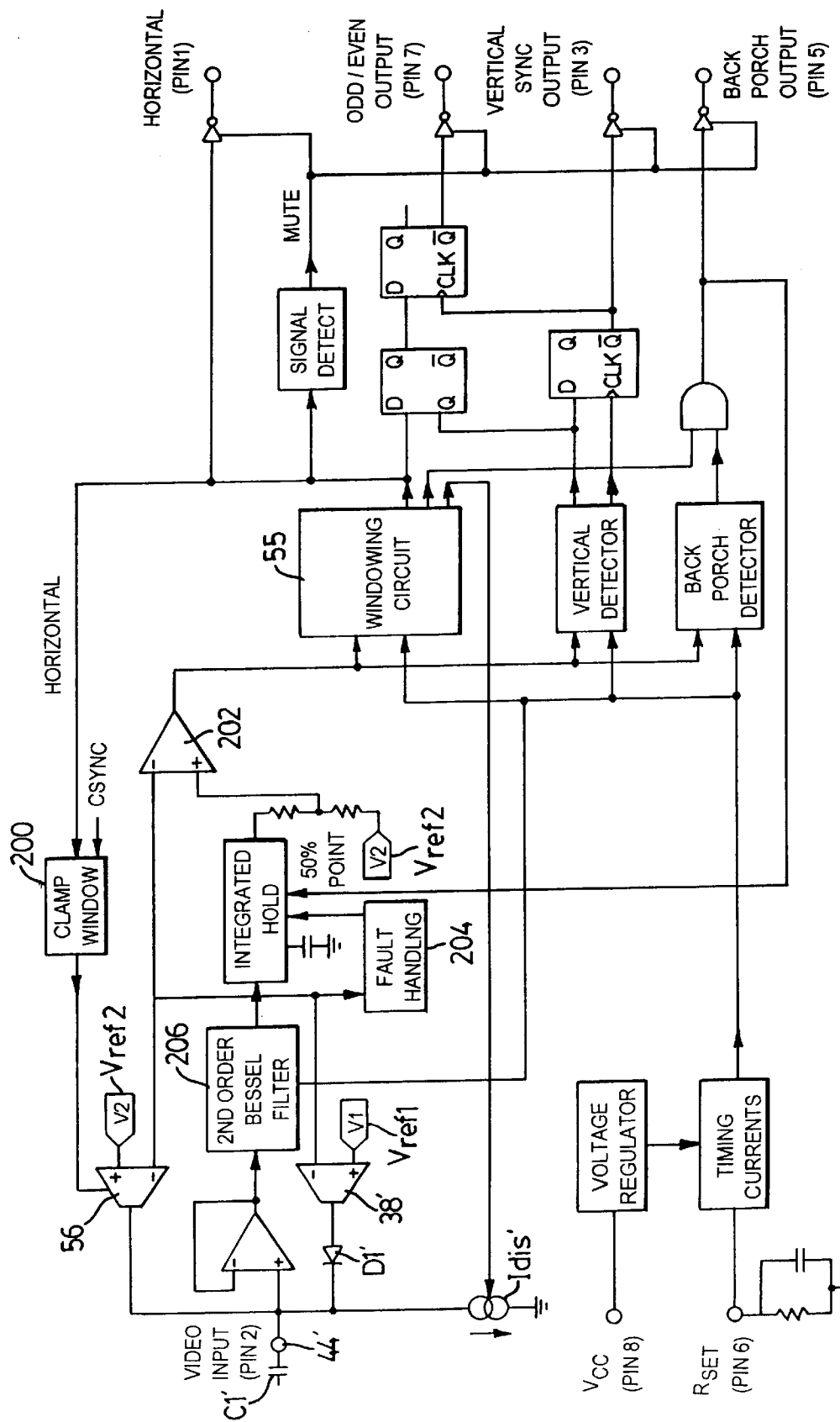
FIG. 13 is a block diagram showing how the circuits previously described may be combined.

A block diagram of a complete circuit (implemented on a single chip) incorporating the circuits described, is shown in FIG. 13. In FIG. 13, the clamped video input appears at point 44', and corresponding reference numerals indicate parts corresponding to those of FIGS. 1 to 12. In FIG. 13, the clamp window 200 includes the monostable 76 and AND gate 78 of FIG. 3; comparator 202 is comparator 68 of FIG. 3 and comparator 92 of FIG. 6; the fault handling circuit 204 includes the monostable 96 and flip flop 98 of FIG. 6; and filter 206 is simply a color burst filter.

While preferred embodiments of the invention have been described, it will be realized that the embodiments disclosed are illustrative and not restrictive, and that all changes within the meaning and spirit of the invention are intended to be embraced by the appended claims.

I claim:

1. A clamping circuit for clamping sync signals in a video signal, said clamping circuit comprising:
   (a) an input for said video signal, said video signal having sync pulses therein,
   (b) a capacitance coupled to said input,
   (c) symmetrical clamping means and non-symmetrical clamping means each coupled to said capacitance,
   (d) said symmetrical clamping means comprising amplifier means having an output coupled to said capacitance, said amplifier having an enable input and an input for a first reference voltage, said amplifier being controllable by an enable signal applied to said enable input for clamping the voltage at said output to said first reference voltage,
   (e) means for providing an enable signal responsive to said sync pulses for enabling said amplifier to cause said amplifier to clamp the voltage at its output to said reference voltage during at least a portion of each sync pulse,
   (f) said non-symmetrical clamping means including means for charging said capacitance to a predetermined minimum voltage level,
   (g) said non-symmetrical clamping means further including means responsive to the absence of a continued series of said sync pulses for discharging said capacitance.

2. A circuit according to claim 1 wherein said means for discharging said capacitance includes a current source.

3. A circuit according to claim 2 wherein said symmetrical clamping means includes means responsive to receipt of a continued series of sync pulses for turning off said current source during receipt of said series.

4. A circuit according to claim 3 wherein the rate of discharge of said capacitance between said sync pulses is negligibly small when said current source is turned off.

5. A circuit according to claim 1 wherein said means for producing said enable signal includes means for processing said sync signal to remove at least some noise pulses therefrom.

6. A video signal detector having a video signal input for receiving a video signal having a series of sync pulses, and having at least one sync signal output, and for enabling said output when a valid video signal is present at said input and for muting said output when no valid video signal is present at said input, said circuit comprising:
   (a) circuit means coupled to said input for producing a reference sync signal having reference sync pulses at a frequency corresponding to that of said sync signal,
   (b) counter means for counting a predetermined number of said reference sync pulses and for producing a predetermined count signal on receipt of said predetermined number,
   (c) output circuit means coupled to said counter means and responsive to said predetermined count signal for enabling or muting said output in response thereto,
   (d) frequency circuit means responsive to the frequency of said sync pulses and including comparator means to define the high and low limits of a predetermined range for said frequency and for producing a memory signal indicative of whether said frequency is within said predetermined range,
   (e) disabling means coupled to said frequency circuit means for causing said output to be muted when said frequency is outside said predetermined range.

7. A circuit according to claim 6 wherein said disabling means includes means for clearing said counter when said frequency is outside said predetermined range.

8. A circuit according to claim 6 and including timer means responsive to said frequency being outside said predetermined range for inhibiting muting of said output by said disabling means for a predetermined period of time after said frequency has moved outside said predetermined range, thereby to avoid muting of said output due to momentary disturbances in said video signal.

9. In a video signal detector having a video signal input for receiving a video signal having a series of sync pulses, and having at least one sync output, a method for enabling said output when a valid video signal is present at said input, said method comprising:

(a) providing circuit means coupled to said input for producing a reference sync signal having reference sync pulses at a frequency corresponding to that of said sync signal, (b) providing counter means for counting a predetermined number of said reference sync pulses and for producing a predetermined count signal on receipt of said predetermined number, (c) providing output circuit means coupled to said counter means and responsive to said predetermined count signal for enabling said output in response thereto, (d) providing frequency circuit means responsive to the frequency of said sync pulses and including comparator means to define the high and low limits of a predetermined range for said frequency and for producing a memory signal indicative of whether said frequency is within said predetermined range, (e) providing noise pulse indicator means responsive to a noise pulse occurring between said sync pulses, (f) determining whether the predetermined count signal is produced, (g) determining whether said memory signal is within said predetermined range, (h) determining whether the number of consecutive sync pulses free from the occurrence of a noise pulse is at least one-half the number of sync pulses required to produce the predetermined count signal, and (i) repeating steps (f) through (h) and enabling said output upon all requirements in steps (f) through (h) being met.

\* \* \* \* \*